United States Patent [19]
Grimm et al.

[11] Patent Number: 5,144,851
[45] Date of Patent: Sep. 8, 1992

[54] JAM TOLERANT LINEAR ACTUATOR

[75] Inventors: Duane H. Grimm, Rockford; Teddy L. Jones, Cherry Valley, both of Ill.

[73] Assignee: Sundstrand Corp., Rockford, Ill.

[21] Appl. No.: 738,763

[22] Filed: Aug. 1, 1991

[51] Int. Cl.⁵ ............................................. F16H 25/22
[52] U.S. Cl. ..................... 74/424.8 B; 74/89.15; 74/424.8 R
[58] Field of Search ............... 74/424.8 R, 424.8 B, 74/89.15

[56] References Cited

U.S. PATENT DOCUMENTS

| | | | |
|---|---|---|---|
| 3,766,790 | 10/1973 | Weir | 74/89.15 |
| 4,603,594 | 8/1986 | Grimm | 74/424.8 R X |
| 4,637,272 | 1/1987 | Teske et al. | 74/424.8 R |
| 4,679,485 | 7/1987 | Nelson et al. | 74/424.8 R X |
| 4,745,815 | 5/1988 | Klopfenstein | 74/424.8 R |

Primary Examiner—Allan D. Herrmann
Attorney, Agent, or Firm—Harold A. Williamson

[57] ABSTRACT

The invention is directed to a jam tolerant ballscrew actuator. The ballscrew actuator is driven through a differential via plural power paths therein. A first of these differential power paths is drivingly coupled to a reciprocating dual ballscrew assembly by way of a rotatable ballnut. A second of the differential power paths is coupled to the dual ballscrew assembly via a rotatable hub having a splined opening therethrough. A reciprocating sleeve having a splined portion engages the sleeve shaft to reciprocate therethrough and be rotated by the rotatable hub. The sleeve shaft additionally includes a rotatable sleeve ballnut portion that drivingly cooperates with the dual ballscrew assembly. The reciprocating rotatable sleeve provides the ballscrew actuator output. The rotatable ballnut and the rotatable sleeve ballnut have equal but opposite leads which provide an axial motion summing characteristic for the dual ballscrew assembly. An internal jam of one of the ballscrews, in the differential, or in any bearing, simply alters the power flow path through the differential and the dual ballscrew assembly but does not affect the overall mechanical advantage or speed ratio of the actuator.

13 Claims, 3 Drawing Sheets

DESCRIPTION OF THE PREFERRED EMBODIMENT

Figure 1:
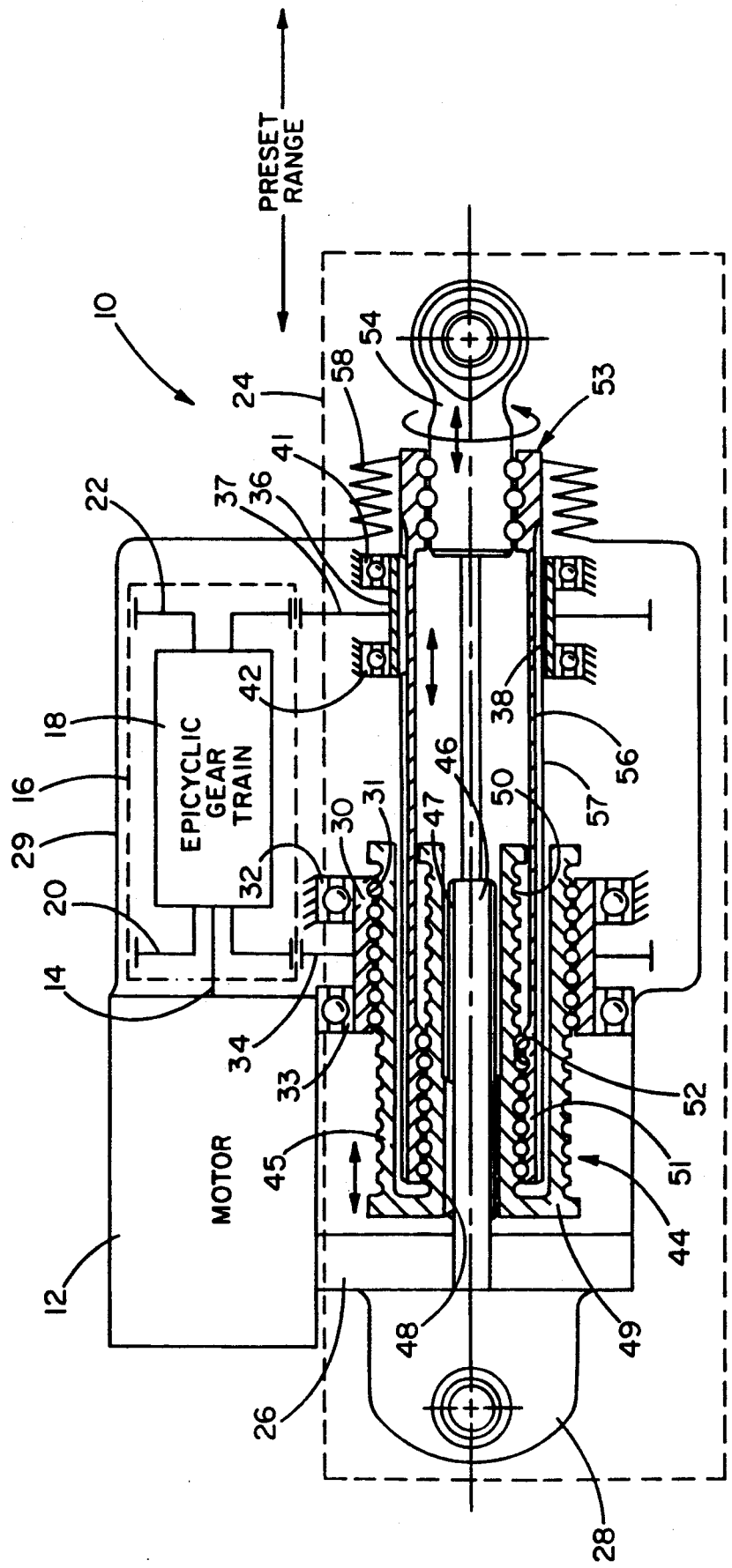
FIG. 1 is a schematic cross-section of a jam tolerant linear actuator embodying the invention.

Reference is now made to FIG. 1 in which there is illustrated a jam tolerant linear ballscrew actuator assembly 10 that represents a preferred embodiment of the invention.

The ballscrew actuator assembly 10 is made up of motor 12, differential 16, and ballscrew actuator 24. The ballscrew actuator 24, as can be seen in the drawing, is set out and defined by a broken line box that surrounds the relevant ballscrew actuator components.

The motor 12 is provided with a motor shaft 14 that delivers power to and through the differential 16. The differential 16 includes an epicyclic gear train 18 that receives input power from motor shaft 14. The details of the differential do not form a part of the invention. Accordingly, any arrangement of gears would be suitable if the gears formed an epicyclic gear train in which an angular speed of one shaft is proportional to the sum of difference of the angular speeds of two other gears which lie on the same axis thereby allowing one shaft to revolve faster than the other, the speed of the main driving member, here shaft 14, being equal to the algebraic mean of the speeds of the two shafts.

The differential 16 has plural power paths with a first power path being delivered through a first power path differential output gear 20 and a second power path being delivered via a second power path differential output gear 22.

The ballscrew actuator 24 includes a mounting frame 26 (shown schematically) which supports the motor 12, differential 16, and an external housing 29 (shown schematically). The mounting frame 26 is provided with an actuator mounting flange 28 with an unreferenced opening to allow the entire assembly to be mounted to the frame of an aircraft, the details of which are not a part of the invention.

A ballnut 30 (shown schematically) has integral therewith a ballnut gear 34 which meshes with the first power path differential output gear 20. Ballnut support bearings 32, 33 are shown schematically mounted in a fixed relationship to the other components of the actuator 10.

To the right of the differential 16, a splined hub 36 has integral therewith a splined hub gear 37 which engages the second power path differential output gear 22. The splined hub 36 is provided with internal splines 38. A pair of splined hub support bearings 41, 42 support the splined hub 36 as shown.

A dual ballscrew assembly 44, shown in section, includes ballscrew assembly base 49 which supports concentrically positioned first ballscrew portion 45 and a second ballscrew portion 50.

In typical fashion, balls (unreferenced) are positioned between an internal screw surface 31 of the ballnut 30 and the first ballscrew portion 45 of the ballscrew assembly 44.

A fixed spline shaft 46, secured to mounting frame 26, has external splines 47 which cooperate with internal ballscrew assembly splines 48. This just described arrangement allows the ballscrew assembly 44 to translate along the fixed spline shaft 46, but not rotate.

A sleeve shaft 56 is provided with external splines 57. This just noted shaft will be referred to from time to time hereinafter as a "splined sleeve shaft".

At the left-hand end of the sleeve shaft 56, and formed integrally therewith, is a splined sleeve ballnut 51 with unreferenced balls disposed between its internal screw threads 52 and the screw threads of the second ballscrew portion 50.

In view of the nature of the mounting arrangement of the sleeve shaft 56, it should be apparent that the sleeve shaft 56 may translate and rotate simultaneously.

The invention contemplates that the ballnut 30 and the splined sleeve ballnut 51 have equal and opposite leads. The lead being the distance the screw will advance or move into a nut in one complete turn. This arrangement allows for an axial summing for the dual ballscrew assembly 44.

The right-hand end of the sleeve shaft 56 is provided with a conventional thrust bearing 53 which accommodates the actuator output member 54. The actuator output member 54 moves over a preset range as graphically indicated in FIG. 1. An output bellows 58, provided to exclude contamination, secured to the housing 29, is shown cooperating with the reciprocating and rotating splined sleeve shaft 56.

OPERATION

In operation, the jam tolerance capability of the instant invention will readily be appreciated. As noted earlier, the jam tolerance capability is achieved by using a dual ballscrew assembly 44 wherein ballnut 30 and splined sleeve ballnut 51 have equal but opposite leads which provide an axial motion summing characteristic of the ballscrew assembly 44. The first and second ballscrew portions 45, 50 are driven from the motor 12 via shaft 14 and differential 16 by way of the first power path differential output gear 20 and the second power path differential output gear 22. The first and second power path differential output gears drive respectively the ballnut 30 via ballnut gear 34 and the splined hub 36 via the splined hub gear 37.

In order to appreciate the cooperation of the ballnut and splined sleeve ballnut with the first and second ballscrew portions 45, 50, let it be assumed that the motor 12 is on and the differential 16 is driven via shaft 14. This results in the turning of both the first and second power path differential output gears 20, 22 in the same direction at the same speed. This will of course drive the ballnut 30 and the splined hub 36 at the same speed via ballnut gear 34 and splined hub gear 37.

Figure 2:
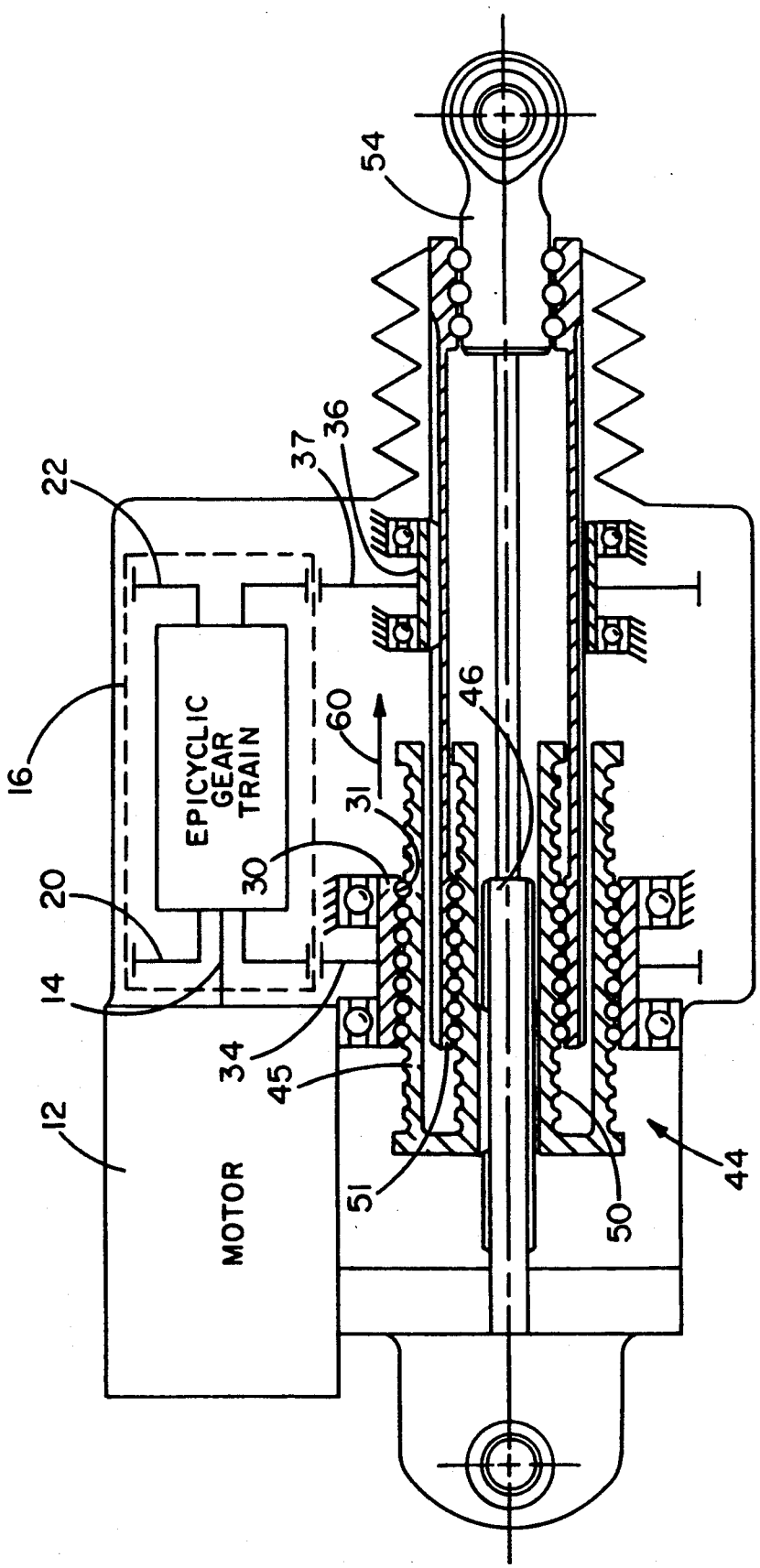
FIG. 2 is the linear actuator of FIG. 1 shown with an output that is one-half of a preset range of travel.

Attention is now directed to FIG. 2 which shows the actuator output member 54 at approximately mid-range of the preset range of travel indicated in FIG. 1. For purposes of explanation only, next assume that the ballnut gear 34 and ballnut 30 are rotating in a direction such that the ballnut gear/ballnut 34, 30, at the point where the reference line for reference numeral 34 touches the ballnut gear 34, are coming out of the page toward the reader.

Next assume that the ballnut 30, with its internal screw surface 31, has a relationship with the first ball-

JAM TOLERANT LINEAR ACTUATOR

TECHNICAL FIELD

This invention relates to a jam tolerant ballscrew actuator and more specifically an actuator that utilizes a dual ballscrew.

BACKGROUND OF THE INVENTION

In the field of aerospace, linear flight control actuators currently in use employ hydraulic cylinders or ballscrews to provide positional control and to react aerodynamic loads. Actuators constructed of hydraulic cylinders are used extensively but are a maintenance issue because of their high potential for fluid leakage. Leakage can occur in distribution line connections, valve blocks, transfer ports, piston seals, etc.

Ballscrews have been used in many secondary flight control systems, such as flaps and slats. Ballscrews have also been used in primary flight control surfaces, such as rudders and ailerons, but to a lesser degree because of the perception in the aerospace industry that ballscrew actuators are prone to jam failures. Although the reliability statistics indicate that jam failures for ballscrew actuators are extremely rare, the perception remains.

Ballscrew actuators offer many advantages relative to other approaches, such as hydraulic cylinders, in terms of higher stiffness, lower weight, lower cost, and packaging flexibility.

Typical of the ballscrew actuators noted above is that shown and described in the Grimm U.S. Pat. No. 4,603,594 ('594). The '594 patent is directed to a fail-safe actuator that includes a single ballscrew in combination with planetary gearing, disk brakes, a solenoid, and motor to actuate control surfaces on an aircraft.

A non-jamming screw actuator system is shown and described in the Klopfenstein U.S. Pat. No. 4,745,815 ('815). The '815 patent achieves a degree of jam tolerance by releasing and engaging multiple electromagnetic clutches to selectively change the torque reaction points in a ballscrew/gear screw actuator assembly. This arrangement requires a sophisticated electronic controller to sense appropriate reactions to failure modes.

Another ballscrew actuator typical of the prior art is that shown and described in the Teske et al U.S. Pat. No. 4,637,272 ('272). The '272 invention employs a single ballscrew and obtains failure mode protection by the provision of redundancy through the use of independently driven ballnuts on the same screw. The ballnuts are driven by separate motors.

The invention to be described hereinafter distinguishes over the prior art above in a most advantageous manner in that the ballscrew actuator of the invention provides a simple mechanical approach utilizing dual ballscrews and a differential mechanism to provide jam tolerance and automatic rate compensation in the unlikely event of a jam in the actuator.

SUMMARY OF THE INVENTION

The invention is directed to a jam tolerant ballscrew actuator. The ballscrew actuator is driven through a differential via plural power paths therein. A first of these differential power paths is drivingly coupled to a reciprocating dual ballscrew assembly by way of a rotatable ballnut.

A second of the differential power paths is coupled to the dual ballscrew assembly via a rotatable hub having a splined opening threrethrough. A reciprocating sleeve having a splined portion engages the sleeve shaft to reciprocate therethrough and be rotated by the rotatable hub. The sleeve shaft additionally includes a rotatable sleeve ballnut portion that drivingly cooperates with the dual ballscrew assembly. The reciprocating rotatable sleeve provides the ballscrew actuator output.

The rotatable ballnut and the rotatable sleeve ballnut have equal but opposite leads which provide an axial motion summing characteristic for the dual ballscrew assembly. An internal jam of one of the ballscrews, in the differential, or in any bearing, simply alters the power flow path through the differential and the dual ballscrew assembly but does not affect the overall mechanical advantage or speed ratio of the actuator.

It is, therefore, a primary object of the invention to provide a jam tolerant dual ballscrew actuator wherein a jam of one of the ballscrews simply alters a power flow path through a differential that provides power to the ballscrew actuator such that the ballscrew actuator overall mechanical advantage and speed ratio remain unaffected.

Another object of the invention is to provide a dual ballscrew assembly for a ballscrew actuator wherein a pair of ballnuts drivingly associated with the dual ballscrew have equal but opposite leads which provide an axial motion summary characteristic for the dual ballscrew assembly.

Yet another object of the invention is the provision of a ballscrew actuator with built-in features that preclude the possibility of jams. In the attainment of the foregoing objects, the jam tolerant linear ballscrew actuator more specifically includes a ballscrew actuator output developed over a preset range of travel. The ballscrew actuator is driven through a differential via plural power paths therein. The ballscrew actuator itself includes a ballnut which is drivingly coupled to a first power path of the differential to rotate as power is provided to the ballnut through the differential.

An internally splined hub is drivingly coupled to a second power path of the differential to rotate as power is provided through the differential to the splined hub.

A dual ballscrew unit is provided that has a first ballscrew portion that reciprocates the dual ballscrew when the ballnut is rotatably driven.

The dual ballscrew is coupled to a fixed splined shaft on which splined shaft the dual ballscrew can only reciprocate as the dual ballscrew is driven through the ballnut as the ballnut rotates.

A splined sleeve is provided that mates with the internally splined hub and reciprocates therethrough. The splined sleeve is mounted for rotation with the splined hub. The splined sleeve is coupled via a splined sleeve ballnut to a second ballscrew portion of the dual ballscrew to reciprocate with the dual ballscrew as the dual ballscrew reciprocates through the ballnut as the ballnut rotates.

The ballnut and the splined sleeve ballnut have equal and opposite leads to thereby provide an axial summing characteristic for the dual ballscrew unit.

An actuator output member is coupled to the splined sleeve to provide the ballscrew actuator output over the preset range of travel as the ballscrew rotates and as the splined sleeve reciprocates through the splined hub as the splined sleeve rotates integrally with the splined hub.

screw portion 45 representing a left-handed thread. Rotation of the ballnut 30 as just noted above will cause the dual ballnut assembly 44 to move axially to the right as indicated by arrow 60.

Since ballnut 30 and splined hub 36 are being driven in the same direction at the same speed, it will be appreciated that the splined sleeve ballnut 51 rotates at the same speed and the same direction as the ballnut 30. The dual ballscrew assembly 44, it will be remembered, cannot rotate because of its splined relationship to fixed splined shaft 46. In summary, the ballnut 30 can rotate but not translate; the ballscrew assembly 44 can translate but not rotate; finally, the splined sleeve ballnut 51 can rotate as well as translate.

Next, assume that the relationship between the splined sleeve ballnut 51 and the second ballscrew portion 50 is of a right-handed threaded nature. It will be apparent that this will result in axial motion of the actuator output member 54 as shown in FIG. 2.

Figure 3:
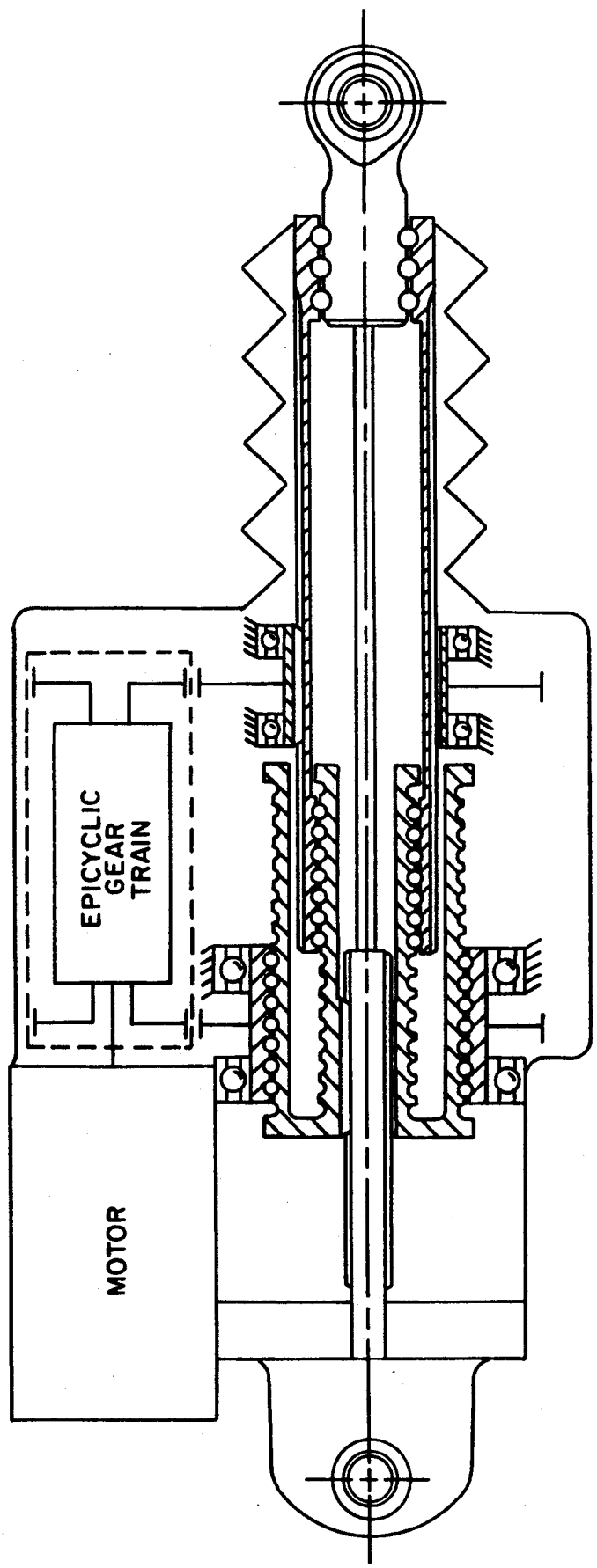
FIG. 3 is the linear actuator of FIG. 1 shown with an output that is at a maximum range of travel.

FIG. 3, which includes no reference numerals, illustrates visually the jam tolerant ballscrew actuator of the invention at the end of its preset range of travel.

From the foregoing, it will be understood that an internal jam in one of the ballscrews, in the differential 16, or in any of the bearings 32, 33, 41, 42 simply alters the power flow path internal to the jam tolerant linear ballscrew assembly 10, all without effect on the overall mechanical advantage or speed ratio of the entire assembly 10.

In order to further understand the jam tolerant characteristics of the invention, two modes of failure will be considered. If the differential 16 locks in a manner that prevents relative motion of the first and second power path differential gears 20, 22, both ballnut 30 and splined sleeve ballnut 51 are driven in the same direction and with the same torque as in the normal operating mode described hereinbefore.

A second potential failure mode occurs if rotation of any of the elements of the epicyclic gear train 18 is inhibited by a jam of an internal component. In this instance, one output leg of the geared differential would be, in effect, grounded to the mounting frame 26 of the actuator assembly 10. The remaining leg of the differential's epicyclic gear train 18 would automatically compensate for the loss of speed in the grounded portion of the epicyclic gear train 18. One of the ballnuts, i.e., ballnut 30 or splined sleeve ballnut 51, would no longer contribute to output motion, however, the remaining ballnut would be driven at twice its normal speed. The overall effect is that the axial travel of the actuator output member 54 per revolution of the motor shaft 14 is unchanged.

Although only a single embodiment of the invention has been illustrated and described, it will be apparent to those skilled in the art that various changes and modifications may be made to the embodiment of the invention without departing from the spirit and scope of the invention.

What we claim as new:

1. A jam tolerant ballscrew actuator having a ballscrew actuator output, said ballscrew actuator driven through a differential via plural power paths therein, said ballscrew actuator comprising:
    a first differential power path drivingly coupled via a first rotatable means to a reciprocating dual ballscrew means;
    a second differential power path coupled to said dual ballscrew means via a second rotatable means that has a reciprocating sleeve means therethrough, said reciprocating sleeve means having a sleeve ballnut portion that drivingly cooperates with said dual ballscrew means, said reciprocating sleeve means providing said ballscrew actuator output.

2. The actuator of claim 1 wherein said dual ballscrew means has a first ballscrew portion and a second ballscrew portion.

3. The actuator of claim 2 wherein said first rotatable means is a ballnut that engages said first ballscrew portion of said dual ballscrew means.

4. The actuator of claim 3 wherein said ballnut and said sleeve ballnut portion have equal but opposite leads to thereby provide an axial summing characteristic of said dual ballscrew means.

5. The actuator of claim 4 wherein said ballscrew actuator output is provided over a preset range of travel.

6. The actuator of claim 5 wherein rotary restraining means are coupled to said dual ballscrew means to limit said dual ballscrew means to reciprocating movement.

7. The actuator of claim 6 wherein said rotary restraining means is a fixed splined shaft on which said dual ballscrew means is mounted for reciprocating travel.

8. The actuator of claim 7 wherein said sleeve ballnut portion includes a splined portion.

9. The actuator of claim 8 wherein said second rotatable means includes a splined hub that matingly receives said splined portion of said sleeve.

10. The actuator of claim 9 wherein said sleeve ballnut portion engages said second ballscrew portion to reciprocate with said dual ballscrew means as said dual ballscrew means reciprocates through said ballnut as said ballnut rotates.

11. The actuator of claim 10 wherein an output member is coupled to said splined portion of said sleeve ballnut portion to provide said ballscrew actuator output over said range of travel as said dual ballscrew means reciprocates through said ballnut as said ballnut is drivingly rotated by power delivered thereto by said first differential power path and as said splined portion of said sleeve ballnut portion reciprocates through said splined hub as said splined portion of said sleeve ballnut portion rotates integrally with said splined hub as said splined hub is drivingly rotated by power delivered thereto by said second differential power path.

12. A jam tolerant linear ballscrew actuator having a ballscrew actuator output over a preset range of travel, said ballscrew actuator driven through a differential via plural power paths therein, said ballscrew actuator comprising:
    a ballnut drivingly coupled to a first power path of said differential to rotate as power is provided through said differential;
    a splined hub drivingly coupled to a second power path of said differential to rotate as power is provided through said differential;
    a dual ballscrew having a first ballscrew portion driven through said ballnut to reciprocate as said ballnut rotates;
    said dual ballscrew coupled to a fixed splined shaft on which said dual ballscrew can only reciprocate as said dual ballscrew is driven through said ballnut as said ballnut rotates;
    a splined sleeve driven through said splined hub, said splined sleeve mounted in said splined hub for reciprocating movement as said splined sleeve rotates integrally with said splined hub, said splined sleeve coupled via a splined sleeve ballnut to a second ballscrew portion of said dual ballscrew to reciprocate with said dual ballscrew as said dual ballscrew reciprocates through said ballnut as said ballnut rotates; and an actuator output member coupled to said splined sleeve to provide said ballscrew actuator output over said range of travel as said dual ballscrew reciprocates through said ballnut as said ballnut rotates and as said splined sleeve reciprocates through said splined hub as said splined sleeve rotates integrally with said splined hub.

13. The actuator of claim 12 wherein said ballnut and said splined sleeve ballnut have equal and opposite leads to thereby provide an axial summing characteristic for said dual ballscrew.

* * * * *